United States Patent
Rajgopal et al.

(10) Patent No.: US 11,675,696 B2
(45) Date of Patent: Jun. 13, 2023

(54) ACTIVE INPUT/OUTPUT EXPANDER OF A MEMORY SUB-SYSTEM

(71) Applicant: Micron Technology, Inc., Boise, ID (US)

(72) Inventors: Suresh Rajgopal, San Diego, CA (US); Jeremy W. Butterfield, Meridian, ID (US); Sean E. Nerich, Boise, ID (US); Dustin J. Carter, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/474,867

(22) Filed: Sep. 14, 2021

(65) Prior Publication Data

US 2021/0406172 A1 Dec. 30, 2021

Related U.S. Application Data (63) Continuation of application No. 16/709,380, filed on Dec. 10, 2019, now Pat. No. 11,132,292.

(51) Int. Cl.
| | |
|---|---|
| *G06F 12/02* | (2006.01) |
| *G06F 12/0831* | (2016.01) |
| *G06F 9/54* | (2006.01) |
| *G06F 12/0882* | (2016.01) |
| *G06F 12/0868* | (2016.01) |

(52) U.S. Cl.
CPC .......... *G06F 12/0246* (2013.01); *G06F 9/544* (2013.01); *G06F 12/0835* (2013.01); *G06F 12/0868* (2013.01); *G06F 12/0882* (2013.01)

(58) Field of Classification Search
CPC .. G06F 12/0246; G06F 12/0835; G06F 9/544; G06F 12/0882; G06F 12/0868
See application file for complete search history.

(56) References Cited

U.S. PATENT DOCUMENTS

| | | | |
|---|---|---|---|
| 9,122,578 B2* | 9/2015 | Kamphenkel | ....... G06F 12/0246 |
| 9,727,258 B1* | 8/2017 | Nazarian | ............... G06F 3/0659 |
| 10,467,155 B2* | 11/2019 | McVay | ............... G06F 13/4282 |
| 2004/0027867 A1 | 2/2004 | Barr et al. | |
| 2008/0126682 A1* | 5/2008 | Zhao | ..................... G06F 3/0659 |
| | | | 711/E12.008 |

(Continued)

FOREIGN PATENT DOCUMENTS

KR 20150000543 A 1/2015

OTHER PUBLICATIONS

PCT Notification of Transmittal of the International Search Report and the Written Opinion of the International Searching Authority for PCT Application No. PCT/US2020/064109, dated Mar. 26, 2021, 8 pages.

*Primary Examiner* — Sean D Rossiter (74) *Attorney, Agent, or Firm* — Lowenstein Sandler LLP (57) ABSTRACT

A value setting associated with one or more parameters of a host-side interface and a memory-side interface of an input/output (I/O) expander is configured to enable Open NAND Flash Interface (ONFI)-compliant communications between a host system and a target memory die of a memory sub-system. The I/O expander processes one or more ONFI-compliant communications between the host system and the target memory die, wherein the one or more ONFI-compliant communications relate to execution of a memory access operation.

20 Claims, 7 Drawing Sheets

(56) References Cited

U.S. PATENT DOCUMENTS

| | | | |
|---|---|---|---|
| 2014/0122775 A1* | 5/2014 | Gera | G11C 8/18 |
| | | | 711/E12.001 |
| 2014/0229757 A1* | 8/2014 | Danayakanakeri | G06F 11/201 |
| | | | 714/4.11 |
| 2016/0062656 A1* | 3/2016 | Ramaraju | G11C 16/10 |
| | | | 711/103 |
| 2016/0217105 A1 | 7/2016 | Khatri | |
| 2018/0024738 A1 | 1/2018 | Ngu | |
| 2018/0052634 A1 | 2/2018 | Ngu | |
| 2018/0181510 A1* | 6/2018 | Liu | G06F 13/36 |
| 2019/0095275 A1* | 3/2019 | Dusija | G06F 3/0679 |
| 2020/0034060 A1* | 1/2020 | Yang | G06F 3/0634 |

\* cited by examiner

FIG. 7

ACTIVE INPUT/OUTPUT EXPANDER OF A MEMORY SUB-SYSTEM

CROSS-REFERENCE TO RELATED APPLICATION

This application is a continuation of U.S. patent application Ser. No. 16/709,380, filed on Dec. 10, 2019, the entirety of which is hereby incorporated by reference herein.

TECHNICAL FIELD

Embodiments of the disclosure relate generally to memory sub-systems, and more specifically, relate to an active input/output expander of a memory sub-system.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to an active input/output (TO) expander of a memory sub-system. An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include an active IO expander to process commands (e.g., read, write, read status, get feature, etc.) from a host system corresponding to data stored in a high capacity storage area including multiple memory stacks each having multiple memory die. The active IO expander includes an interface to the host system (e.g., a host-side interface) that is compliant with Open NAND Flash Interface (ONFI) specifications (herein referred to as an "ONFI-compliant interface" or "ONFI interface") to send and receive commands in accordance with the ONFI protocol. The active IO expander further includes an ONFI-compliant interface to the high capacity storage area including the multiple memory stacks (i.e., a memory-side interface). The active IO expander decodes ONFI commands processed via the host-side interface and the memory-side interface to program or write data to the memory stacks. The active I/O expander operates as a switch (e.g., a 1×2 or 1×4 switch) to select from multiple memory channels to perform addressing functions and communicate with the multiple memory stacks of the high capacity storage area in view of the read and write commands received from the host system.

Conventional memory sub-systems include storage areas that have a limited number of dies per each memory channel. Accordingly, conventional interfaces between a controller of the memory sub-system and the low capacity storage area are configured to support a lower media throughput in order to process commands corresponding to the limited number of dies associated with each memory channel. However, these configurations do not allow for additional memory die to be supported at sufficiently high data transmission rates. As such, as memory sub-system sizes expand with additional memory die, conventional interfaces are not able to support the increased number of memory die per transmission channel.

Aspects of the present disclosure address the above and other deficiencies by including an ONFI-compliant active I/O expander in a memory sub-system to enable an increased number of memory die (e.g., higher capacity) that can be supported by a controller channel, thereby enabling increased media throughput (e.g., greater than 1200 MT/s). The ONFI-compliant active IO expander can decode ONFI-protocol commands relating to writing data to the memory die and reading data from the memory die. The ONFI-compliant active IO expander can perform signal conditioning operations (e.g., buffering, re-timing, re-driving) on signals sent by the host-side controller to and from the memory die.

Advantages of the present disclosure include, but are not limited to, improved host-side and memory-side interfaces configured to support ONFI-compliant drive strength tuning, on-die termination (ODT), and calibrating (e.g., ZQ calibration). Furthermore, the ONFI-compliant active I/O expander enables a host system to connect to a larger number of memory dies at higher speeds and optimizes power and performance behavior of the memory sub-system.

Figure 1:
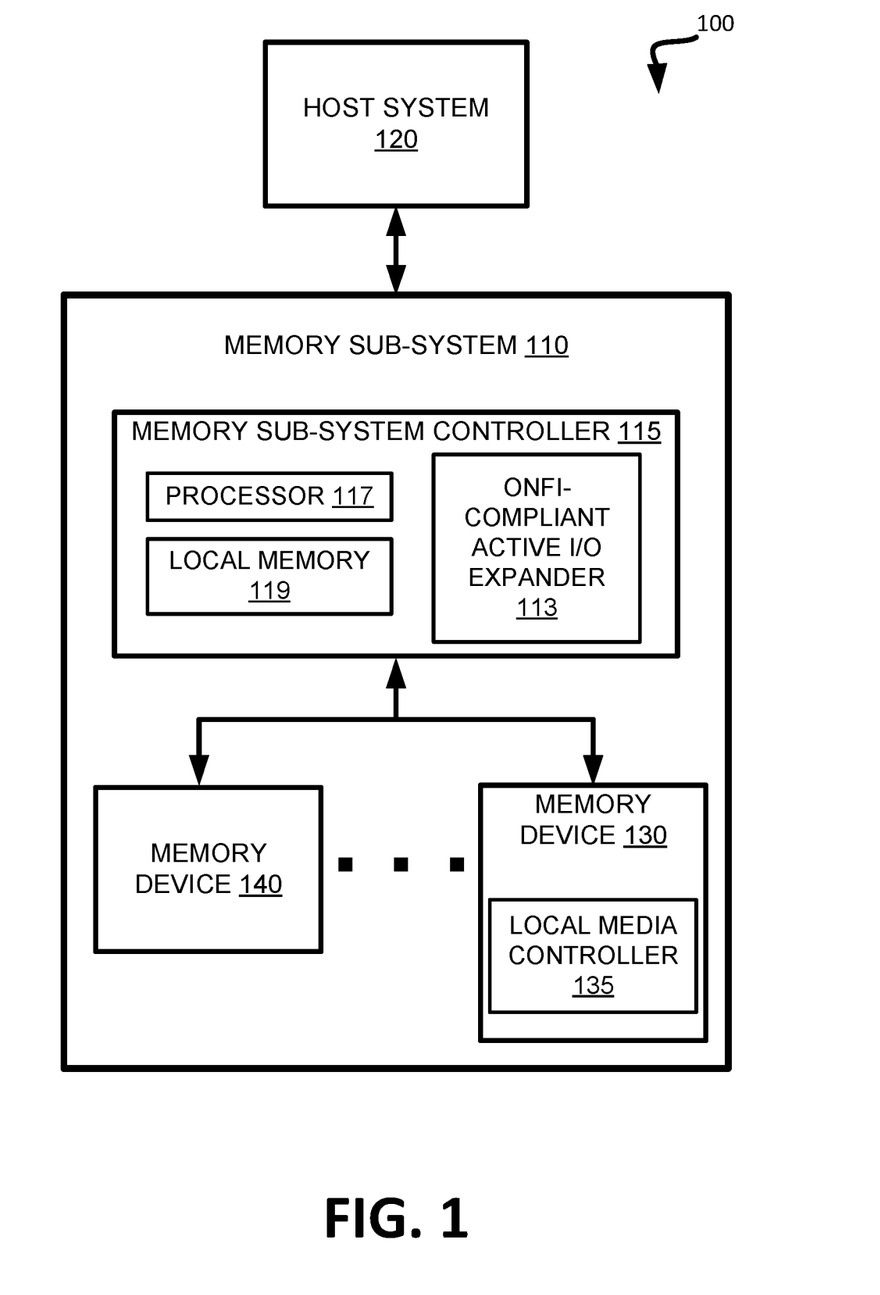
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes an ONFI-compliant active I/O expander 113 (also referred to as an ONFI-compliant active I/O expander) to process commands (e.g., read and write commands) from a host system relating to data stored in a high capacity storage area including multiple memory stacks having multiple memory die. The ONFI-compliant active I/O expander 113 includes a first host-side interface communicatively coupled to a host-side controller (also referred to as a host-side interface) that is compliant with ONFI specifications (herein referred to as an "ONFI-compliant") to send and receive commands in accordance with the ONFI protocol. In an embodiment, the host-side interface can operate at a data transmission rate of between approximately 800 MT/s and approximately 2400 MT/s. The ONFI-compliant active I/O expander 113 also includes an interface to a high capacity storage area including multiple memory stacks, where each memory stack can include multiple memory die (also referred to as the "memory-side interface"). In an embodiment, the memory-side interface of the ONFI-compliant active I/O expander 113 is configured to operate as a demultiplexer or switch between multiple different memory stacks (e.g., a 1×2 switch, a 1×4 switch) operating at data transmission rates of between approximately 800 MT/s-2400 MT/s (e.g., depending on a data loading level and printed circuit board (PCB) trace length)

The active IO expander decodes ONFI commands processed via the host-side interface and the memory-side interface to program or write data to the memory stacks. The active I/O expander operates as a switch (e.g., a 1×2 or 1×4 switch) to select from multiple memory channels to communicate with the multiple memory stacks of the high capacity storage area in view of the read and write commands received from the host system. In an embodiment, the memory sub-system 110 includes multiple ONFI-compliant active I/O expanders 113, where each of the multiple ONFI-compliant active I/O expanders 113 supports one or more sets of memory components (e.g., memory stacks including multiple memory die) in a 2×2 mode.

In an embodiment, the ONFI-compliant active I/O expander 113 provides a communication pathway between with the memory component 112A-112N (e.g., memory die) and the host system 120. In an embodiment, the ONFI-compliant active I/O expander 113 presents as the host system 120 (or controller 115 of the host system 120) at the memory-side interface. In an embodiment, the ONFI-compliant active I/O expander 113 can have a volume address configuration to process commands from the host system 120 and uses volume select commands to select the memory component 112A-112N that is the subject of the command (e.g., a read or write command). In another embodiment, the ONFI-compliant active I/O expander 113 includes a chip enable (CE) decoder to process commands from the host system 120 and uses CE decoding to select the memory component 112A-112N that is the subject of the command.

Advantageously, the ONFI-compliant active I/O expander 113 performs one or more signal conditioning operations (e.g., buffering, retiming, redriving, etc.) on the signals and corresponding data communicated between the host system 130 and the memory components 112A-112N. The ONFI-compliant active I/O expander 113 operates at ONFI-level speeds and enable parameter tuning (e.g., power management, drive strength (DS), on-die termination (ODT), calibration) to operate for multiple different memory configurations at increased speeds (e.g., in a range of 800 MT/s and 2400 MT/s), such as, for example an average operating speed of approximately 1200 MT/s. In an embodiment, this enable the ONFI-compliant active I/O expander 113 to deliver performance at optimized power levels.

Figure 2:
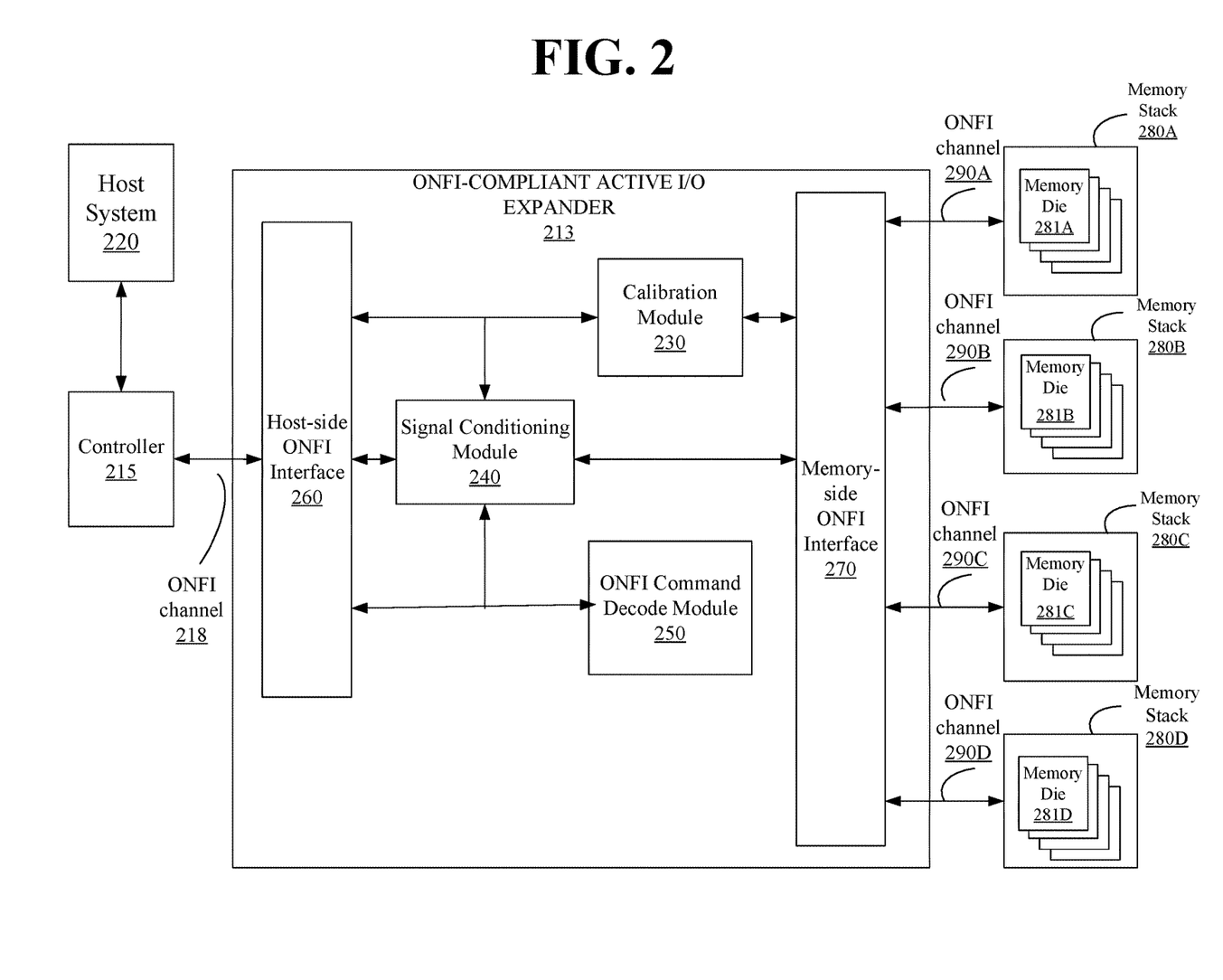
FIG. 2 illustrates an example active input/output (I/O) expander associated with a memory sub-system in accordance with some embodiments of the present disclosure.

FIG. 2 illustrates an example ONFI-compliant active I/O expander 213 communicatively coupled to a controller 215 of a host system 220 and multiple memory components (e.g., multiple memory stacks 280A-280D each having sets of multiple memory die (281A-281D). In an embodiment, each memory stack (e.g., memory stack 280A) includes a die loading level of multiple memory die 281 (e.g., memory die 281A), such as four, eight, sixteen, thirty-two, or sixty-four memory dies per each memory stack and corresponding ONFI channel (e.g., ONFI channel 290A). The ONFI-compliant active I/O expander 213 manages signals between the host system 220 (e.g., via controller 215) and the memory stacks 280A-280D to execute various commands (e.g., read and write commands). As shown in FIG. 2, the ONFI-compliant active I/O expander 213 includes a host-side ONFI interface 260 to communicate with the controller 215 of the host system 220 via an ONFI channel 218 (e.g., a channel compliant with the ONFI protocol and specifications). In an example, the host-side ONFI interface 260 (e.g., an ONFI4 NV-DDR3 interface) is configured to process data at a rate in an approximate range of at least 800 MT/s to 1600 MT/s. FIG. 2 illustrates an example 1×4 ONFI-compliant active I/O expander 213, where the ONFI-compliant active I/O expander 213 communicates with four different memory stacks 280A-280D via respective ONFI channels 290A-290D.

As shown in FIG. 2, the ONFI-compliant active I/O expander 213 includes a memory-side ONFI interface 270 to communicate with the multiple memory stacks 280A-280D and corresponding memory die 281A-281D via a respective ONFI channel 290A-290D. In an embodiment, the memory-side ONFI interface 270 is an 8-bit data/strobe interface. In an example, the memory-side ONFI interface 260 (e.g., an ONFI4 NV-DDR3 interface) is configured to process data at a rate in an approximate range of at least 800 MT/s to 1600 MT/s.

Figure 6:
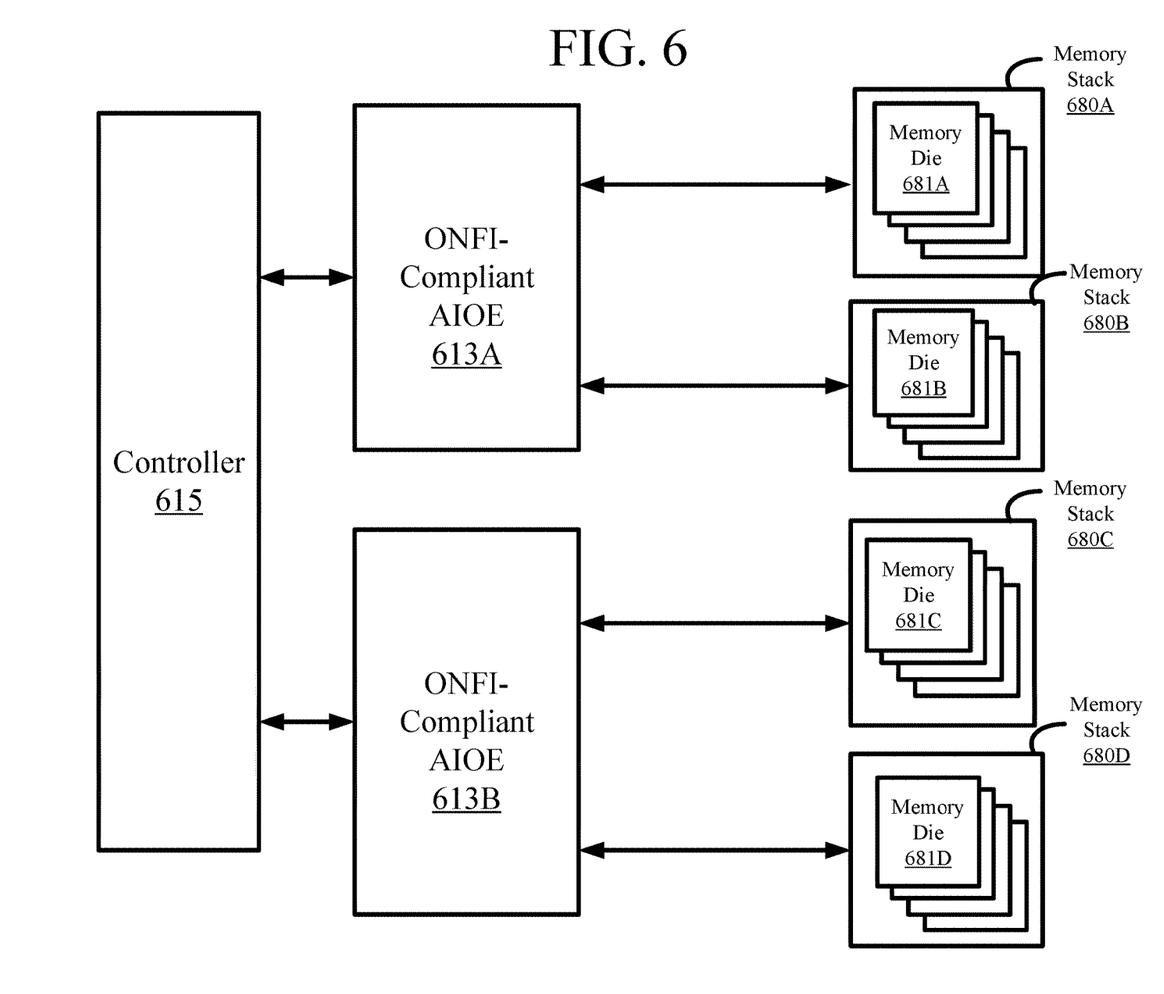
FIG. 6 illustrates an example of multiple active I/O expanders each associated with multiple memory stacks in accordance with some embodiments of the present disclosure.

The ONFI-compliant active I/O expander 213 also includes a calibration module 230, a signal conditioning module 240, and an ONFI command decode module 250 to perform various operations and functions relating to the processing of signals between the controller 215 of the host system 220 and the memory stacks 280A-280D. In an embodiment, the calibration module 230 configures or tunes one or more parameters of the host-side ONFI interface 260 and the memory-side ONFI interface 270. For example, the calibration module 230 can tune drive strength (DS) and on-die termination (ODT) settings for the host-side ONFI interface 260 and the memory-side ONFI interface 270. In an embodiment, the calibration module 230 can initiate a calibration process to change one or more values of the memory-side ONFI interface 270 to enable ONFI-compliant communications (e.g., a ZQ calibration process). In an embodiment, the calibration process can be initiated via the ONFI channel 290A-290D corresponding to the memory stack 280A-280D addressed in a read or write command to tune parameters in view of the target memory die. In an embodiment including multiple ONFI-compliant active I/O expanders (e.g., as shown in FIG. 6), in response to a command identifying a memory die of interest (e.g., a memory die that is subject to the command, also referred to as a "target memory die"), the calibration module 230 selects the ONFI-compliant active I/O expander associated with the corresponding memory stack 280A-280D including the target memory die. In an embodiment, the calibration module 230 is a component of each ONFI-compliant active I/O expander 213. For example, when there are multiple ONFI-compliant active I/O expander 213 each with a calibration module 230, the process can be initiated in a broadcast fashion, via a host-side ONFI channel command, wherein each calibration module 230 operates on its respective memory side interface. In an embodiment, there are no communications or coordination between the multiple ONFI-compliant active I/O expanders 213.

In an embodiment, the host-side ONFI interface 260 and the memory-side ONFI interface 270 settings (e.g., the DS and ODT settings) can be set to match a parasitic load on the traces and the interfaces of the active I/O expander.

The ONFI command decode module 250 receives, inspects, decodes and passes through a read command received from the host system 220 to a target memory die (e.g., the memory die that is the subject of the read command). In an embodiment, the ONFI command decode module 250 provides memory address information (e.g., memory page address information) associated with the current command (e.g., a destination page address for a write command or a page address to read the data for a read command).

In an embodiment, the signal conditioning module 240 conditions the signals transmitted between the host system 220 and the memory stacks 280A-280D. In an embodiment, signals received from both the host-side ONFI interface 260 and the memory-side ONFI interface 270 are conditioned (or re-conditioned) in accordance with the ONFI specifications for transmission via the ONFI interfaces 260, 270 and ONFI channels 218, 290A-290D. For example, the signal conditioning module 240 can buffer, retime, and re-drive the data to the controller 215 of the host system 220 and the memory stacks 280A-280D.

Figure 3:
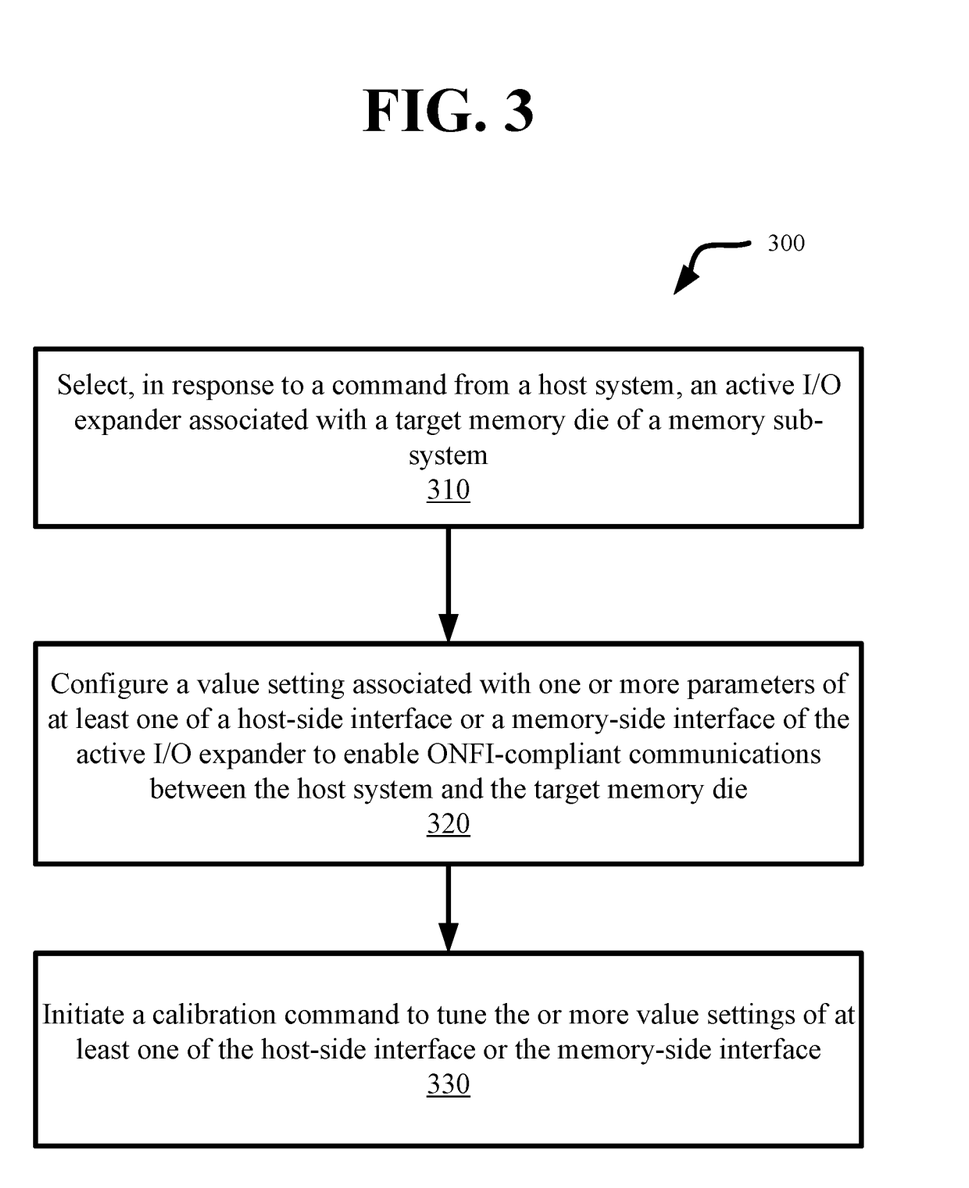
FIG. 3 a flow diagram of an example method associated with configuring and calibrating an active I/O expander of a memory sub-system in accordance with some embodiments of the present disclosure.

FIG. 3 is a flow diagram of an example method 300 to perform configuration of parameters and calibration of an ONFI-compliant active I/O expander of a memory sub-system in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the ONFI-compliant active I/O expander 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device selects, in response to a command from a host system, an active I/O expander associated with a target memory die of a memory sub-system. In an embodiment, the target memory die is identified as a memory die of interest that is the subject of a command (e.g., a read command, a write command, etc.) from a host system. In an embodiment, the active I/O expander is selected from multiple active I/O expanders included within the memory sub-system, where each active I/O expander is connected to multiple memory stacks (e.g., multiple NAND packages), and where each of the multiple memory stacks includes multiple memory dies. An example of a memory sub-system including multiple active I/O expanders is shown in FIG. 6.

In operation 320, the processing device configures a value setting (e.g., a register setting) associated with one or more parameters of at least one of a host-side ONFI interface and a memory-side ONFI interface of the active I/O expander to enable ONFI-compliant communications between the host system and the target memory die. In an embodiment, the one or more parameters can include a drive strength parameter and on-die termination (ODT) parameter. In an embodiment, resistor values can be selected to provide optimal slew rate and impedance matching to achieve the desired performance for the loading, without dissipating excess power. In an embodiment, this behavior can change from system to system, such that the tuning of these settings in firmware provides valuable control functionality. For example, the host-side interface can be configured to have a value setting of 37.5 Ohms or 50 Ohms for the drive strength parameter. In another example, the value setting of the ODT parameter for the memory-side interface can be 50 Ohms, 75 Ohms, 150 Ohms, etc.

In an embodiment, configuring the value setting of the one or more parameters enables operation of the ONFI-compliant active I/O expander in different memory configurations (e.g., different SSD configuration including memory die having single level cells (SLCs), multi-level cells (MLCs), triple level cells (TLCs) or quad-level cells (QLCs)). In an embodiment, configuring the one or more parameters allows the ONFI-compliant active I/O expander to be used with different printed circuit board (PCB) types and memory die loading levels (e.g., the number of memory die per channel or memory stack).

In operation 330, the processing device initiates a calibration command to tune the one or more parameters of at least one of a host-side interface or a memory-side interface. In an embodiment, the calibration command is a ZQ calibration command. In an embodiment, the calibration procedure can track drift in the drive strength resistor values due to process, voltage or temperature variations. In an embodiment, incorporation of the calibration process in an ONFI-compliant active I/O expander allows for more accurate performance tracking. In an embodiment, the ZQ calibration (ZQCAL) command can manage process-voltage-temperature (PVT) variations in the one or more parameters (e.g., the drive strength and ODT values).

In an embodiment, operations 320 and 330 can be performed in parallel. In an embodiment, the value settings for the various parameters (e.g., DS, ODT, DS, ZQCAL) can be configured with an ONFI-compliant set field (SETF) feature with a dedicated address space that is not used by the memory stacks of the sub-system (e.g. the ONFI-compliant active I/O expander can decode the dedicated address and not forward any SETF commands in the address space to the memory stacks).

Figure 4:
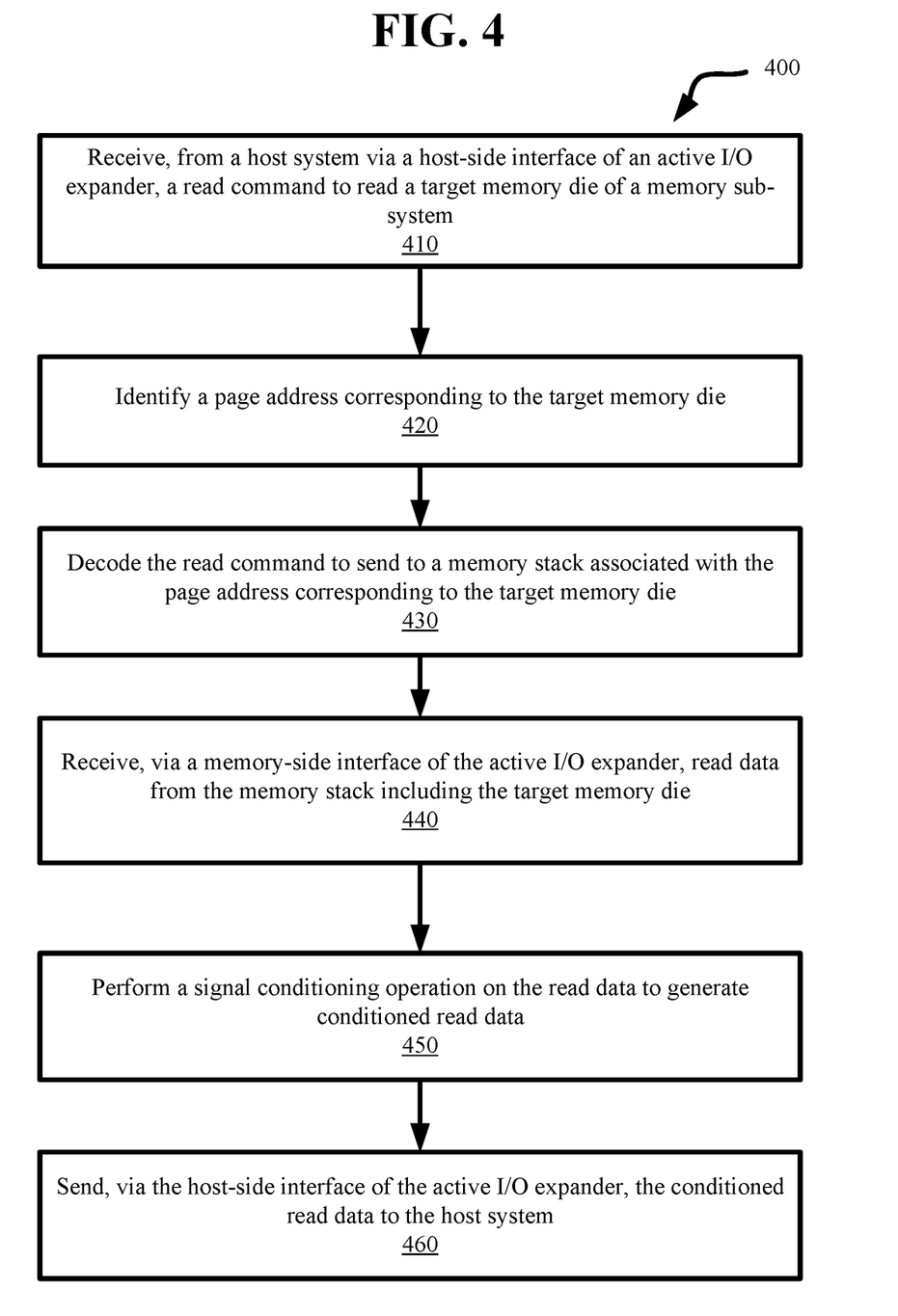
FIG. 4 is a flow diagram of example method of an active I/O expander processing a read command from a host system in accordance with some embodiments of the present disclosure.

FIG. 4 is a flow diagram of an example method 400 for an ONFI-compliant active I/O expander of a memory-subsystem to manage a read command provided by a host system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the ONFI-compliant active I/O expander 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device receives, from a host system via a host-side interface of an active I/O expander, a read command to read data of a target memory die of a memory sub-system. In an embodiment, the read command is transmitted via an ONFI channel connecting the host-side interface with a controller of the host system. In an example, the ONFI channel and host-side interface operate in accordance with the ONFI protocol at a rate between 800 MT/s and 1600 MT/s.

In operation 420, the processing device identifies a page address corresponding to the target memory die. In an embodiment, the page address can be determined by the flash translation layer (FTL) on the host-side controller. That in turn communicates with the appropriate ONFI channels flash controller which then dispatches the physical memory die page address to the correct ONFI channel. In an embodiment, the active I/O expander determines which of the multiple connected memory stacks includes the target memory die and identifies the corresponding page address.

In operation 430, the processing device decodes the read command to send to a memory stack associated with the page address corresponding to the target memory die. In an embodiment, an ONFI command decode module of the active I/O expander (e.g., the ONFI Command Decode Module 250 of FIG. 2) receives the read command from the host-side ONFI-compliant interface (e.g., host-side ONFI interface 260 of FIG. 2), inspects the read command, and decodes the read command. In an embodiment, the read command format can be specified in the ONFI specifications (e.g., a Multi-Plane Read command can consists of two command cycles 00h-32h).

After decoding the read command, the decoded command is sent to the memory stack associated with the target memory die via the memory-side interface of the active I/O expander. In an embodiment, the read command is transmitted to the selected memory stack of the target memory die with the page address including the data to be read. In an embodiment, operation 430 can be performed for other commands associated with a memory stack, such as a read status command or a get feature command. The decoded read command is transmitted by a memory-side ONFI interface via an ONFI channel to the destination memory stack. In an example, the read command can be transmitted via the ONFI channel at a rate in a range of approximately 800 MT/s to approximately 1600 MT/s.

In operation 440, the processing device receives, via a memory-side interface of the active I/O expander, read data from the memory stack including the target memory die. In an embodiment, the read data (i.e., the data read from the target memory die) is transmitted by the memory stack via an ONFI channel to the memory-side interface of the active I/O expander.

In operation 450, the processing device performs a signal conditioning operation on the read data to generate conditioned read data. In an embodiment, the memory-side ONFI-compliant interface passes the read data to a signal condition module of the active I/O expander (e.g., signal conditioning module 240 of FIG. 2) to perform the one or more signal conditioning operations. In an embodiment, the signal conditioning operation can include one or more of buffering and retiming the read data. In an embodiment, the buffering operation can include one or more I/O drivers configured to boost and reshape the slope of the signal as it leaves the active I/O expander. In an embodiment, the drive-strength and ODT settings help match this to the receiver. In an embodiment, the retiming operation can clock, latch and drive the signal out, helping clean up incoming jitter and further boosting performance. In an embodiment, the read data can be conditioned to satisfy applicable signal integrity (SI) and performance requirements (e.g., exit latency requirements, reliability requirements, etc.)

In operation 460, the processing device sends, via the host-side interface of the active I/O expander, the conditioned read data to the host system. In an embodiment, the processing device transmits the conditioned read out to the controller of the host system via the host-side ONFI-compliant interface of the active I/O expander and the conditioned read data is sent via an ONFI-compliant channel at a data rate in a range of approximately 800 MT/s and approximately 1600 MT/s. In an example, the average data read of the conditioned read data sent to the host system is approximately 1200 MT/s.

Figure 5:
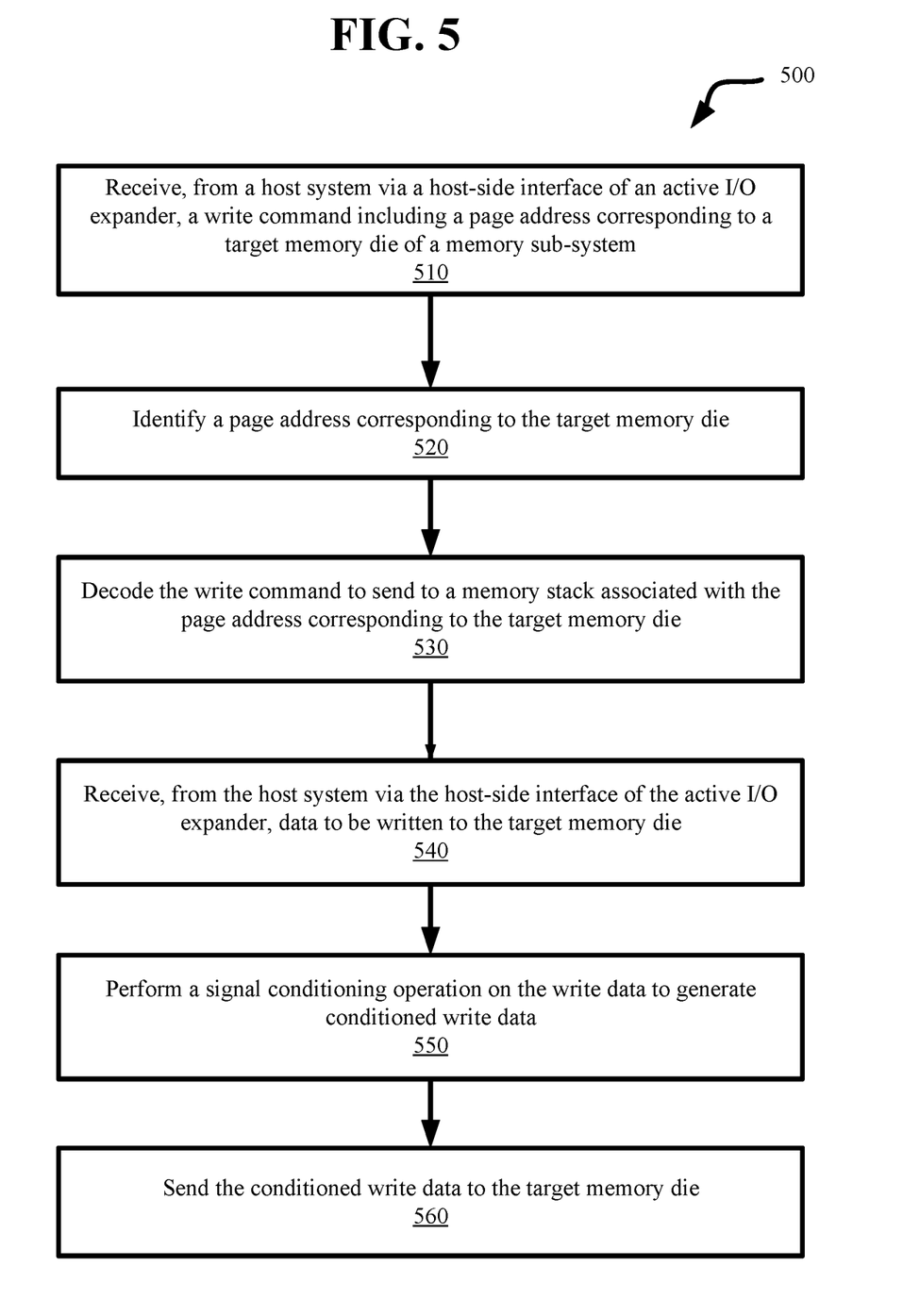
FIG. 5 is a flow diagram of example method of an active I/O expander processing a read command from a host system in accordance with some embodiments of the present disclosure.

FIG. 5 is a flow diagram of an example method 500 for an ONFI-compliant active I/O expander of a memory-subsystem to manage a write command provided by a host system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the ONFI-compliant active I/O expander 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device receives, from a host system via a host-side interface of an active I/O expander, a write command to write data to a target memory die of a memory sub-system. In an embodiment, the write command is transmitted via an ONFI channel connecting the host-side interface with a controller of the host system. In an example, the ONFI channel and host-side interface operate in accordance with the ONFI protocol at a rate between 800 MT/s and 1600 MT/s.

In operation 520, the processing device identifies a page address corresponding to the target memory die. In an embodiment, the active I/O expander determines which of the multiple connected memory stacks includes the target memory die and identifies the corresponding page address.

In operation 530, the processing device decodes the write command to send to a memory stack associated with the page address corresponding to the target memory die. In an embodiment, an ONFI command decode module of the active I/O expander (e.g., the ONFI Command Decode Module 250 of FIG. 2) receives the write command from the host-side ONFI interface (e.g., host-side ONFI interface 260 of FIG. 2), inspects the write command, and decodes the write command. After decoding the write command, the decoded command is sent to the memory stack associated with the target memory die via the memory-side ONFI-compliant interface of the active I/O expander. In an embodiment, the write command is transmitted to the selected memory stack of the target memory die with the page address including the data to be programmed. The decoded write command is transmitted by a memory-side ONFI-compliant interface via an ONFI channel to the destination memory stack. In an example, the write command can be transmitted via the ONFI channel at a rate in a range of approximately 800 MT/s to approximately 1600 MT/s.

In operation 540, the processing device receives, from the host system via the host-side interface of the active I/O expander, data to be written (also referred to as "write data") to the target memory data. In an embodiment, the host system can provide the write data to the active I/O expander a short time duration following operation 530. In an embodiment, the write data (i.e., the data to be written to the target memory die) is transmitted by the controller of the host system via an ONFI channel to the host-side interface of the active I/O expander.

In operation 550, the processing device performs a signal conditioning operation on the write data to generate conditioned write data. In an embodiment, the memory-side interface passes the write data to a signal condition module of the active I/O expander (e.g., signal conditioning module 240 of FIG. 2) to perform the one or more signal conditioning operations. In an embodiment, the signal conditioning operation can include one or more of buffering and retiming the write data.

In operation 560, the processing device sends the conditioned write data to the target memory die. In an embodiment, the processing device transmits the conditioned write data out to the memory stack associated with the target memory die via the memory-side interface of the active I/O expander and the conditioned write data is sent via an ONFI-compliant channel at a data rate in a range of approximately 800 MT/s and approximately 1600 MT/s. In an example, the average data read of the conditioned read data sent to the host system is approximately 1200 MT/s.

In an embodiment, method 300 (of FIG. 3) can be performed as a part of either method 400 (of FIG. 4) or method 500 (of FIG. 5). In an embodiment, operations 310-330 can be performed for a read command in connection with operations 410-460. For example, operation 410 can be performed following execution of operations 320 or 330 (e.g., in the event operations 320 and 330 are performed in parallel). In an embodiment, operations 310-330 can be performed for a write command in connection with operations 510-560. For example, operation 510 can be performed following execution of operations 320 or 330 (e.g., in the event operations 320 and 330 are performed in parallel).

FIG. 6 illustrates a system having a 2×2 configuration where ONFI-compliant active I/O expander 613A is connected to memory stack 680A and memory stack 680B, and ONFI-compliant active I/O expander 613B is connected to memory stack 680C and memory stack 680D. Accordingly, in the example shown in FIG. 6, if a target memory die (e.g., the subject of a read command according to FIG. 4 or a write command according to FIG. 5) is part of the memory die set 681C, the processing device selects ONFI-compliant active I/O expander 613B B to process the command and corresponding signals (e.g., as detailed above with respect to operation 310 of FIG. 3).

Figure 7:
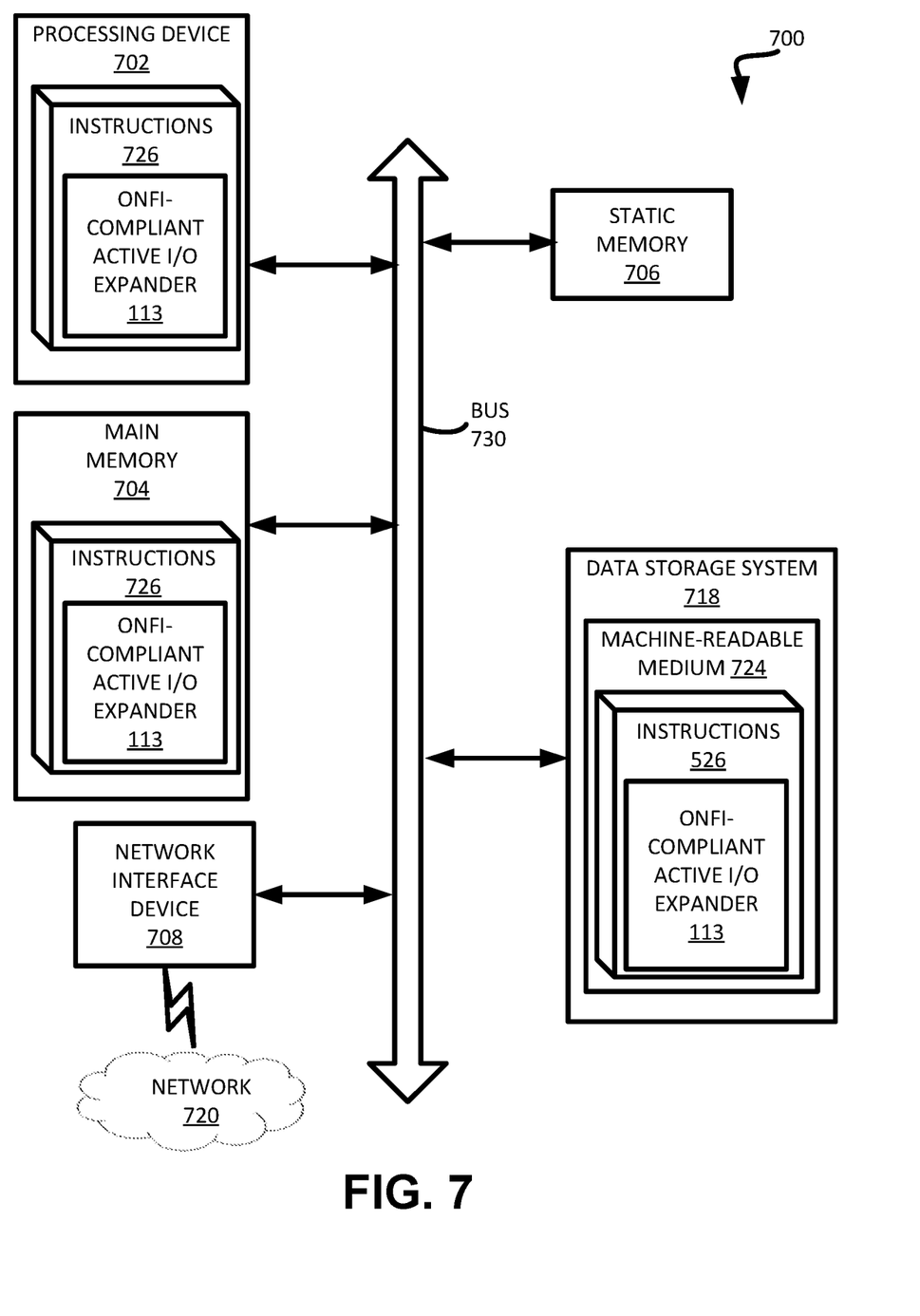
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the ONFI-compliant active I/O expander 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a cache management component (e.g., the ONFI-compliant active I/O expander 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   configuring, by a processing device, a value setting associated with one or more parameters of a host-side interface and a memory-side interface of an input/output (I/O) expander to enable Open NAND Flash Interface (ONFI)-compliant communications between a host system and a target memory die of a memory sub-system; and
   processing, by the I/O expander, one or more ONFI-compliant communications between the host system and the target memory die, wherein the one or more ONFI-compliant communications relate to execution of a memory access operation.

2. The method of claim 1, further comprising:
   receiving, by the processing device from a host system via the host-side interface of the I/O expander, a read command to read the target memory die.

3. The method of claim 2, further comprising:
   receiving, via the memory-side interface of the I/O expander, in response to the read command, read data from the target memory die.

4. The method of claim 3, further comprising:
   performing a signal conditioning operation on the read data to generate conditioned read data; and
   sending via the host-side interface of the I/O expander, an ONFI-compliant communication comprising the conditioned read data to the host system.

5. The method of claim 4, wherein the signal condition operation comprises at least one of a buffering operation or a retiming operation.

6. The method of claim 1, further comprising selecting the I/O expander from a plurality of active I/O expander in response to a memory access command.

7. The method of claim 1, wherein the one or more parameters comprise at least one of drive strength parameter or on-die termination parameter.

8. The method of claim 1, further comprising initiating a calibration command to tune the value setting associated with the one or more parameters of the host-side interface and the memory-side interface.

9. The method of claim 1, wherein the value setting is tuned to match a parasitic load on the I/O expander.

10. A system comprising:
   a memory component comprising a memory die;
   a processing device operatively coupled to the memory component, the processing device to perform operations comprising:

configuring a setting associated with a parameter of a memory-side interface of an input/output (I/O) expander to enable Open NAND Flash Interface (ONFI)-compliant communications with the memory die; and performing a signal conditioning operation on data to be written to the memory die to generate conditioned write data; and sending, via the memory-side interface of the I/O expander, an ONFI-compliant communication comprising the conditioned write data to the memory die.

11. The system of claim 10, the operations further comprising configuring an additional setting associated with the parameter of a host-side interface of the I/O expander to enable ONFI-compliant communications with a host system.

12. The system of claim 11, wherein the host-side interface and the memory-side interface of the I/O expander process one or more ONFI-compliant communications relating to execution of a memory access operation.

13. The system of claim 11, the operations further comprising:

receiving, from a host system via the host-side interface of the I/O expander, a write command identifying the memory die;

decoding the write command to send to the memory die; and receiving, from the host system via the host-side interface of the I/O expander, an ONFI-compliant communication comprising data to be written to the memory die.

14. The system of claim 10, the operations further comprising selecting the I/O expander from a plurality of I/O expanders.

15. The system of claim 10, wherein the parameter comprises one of a drive strength or on-die termination.

16. A non-transitory computer-readable medium storing instructions that, when executed, cause a processing device to perform operations comprising:

configuring a setting associated with a parameter of a memory-side interface of an input/output (I/O) expander to enable Open NAND Flash Interface (ONFI)-compliant communications with a memory die; and performing a signal conditioning operation on data to be written to the memory die to generate conditioned write data; and sending, via the memory-side interface of the I/O expander, an ONFI-compliant communication comprising the conditioned write data to the memory die.

17. The non-transitory computer-readable medium of claim 16, the operations further comprising configuring an additional setting associated with the parameter of a host-side interface of the I/O expander to enable ONFI-compliant communications with a host system.

18. The non-transitory computer-readable medium of claim 17, wherein the host-side interface and the memory-side interface of the I/O expander process one or more ONFI-compliant communications relating to execution of a memory access operation.

19. The non-transitory computer-readable medium of claim 17, the operations further comprising:

receiving, from the host system via the host-side interface of the I/O expander, a write command identifying the memory die;

decoding the write command to send to the memory die; and receiving, from a host system via the host-side interface of the I/O expander, an ONFI-compliant communication comprising data to be written to the memory die.

20. The non-transitory computer-readable medium of claim 16, the operations further comprising selecting the I/O expander from a plurality of I/O expanders.

* * * * *